US012030163B2

(12) United States Patent
Wu et al.

(10) Patent No.: US 12,030,163 B2
(45) Date of Patent: Jul. 9, 2024

(54) DUSTPROOF DEVICE FOR ELECTRIC NAIL GUN

(71) Applicant: BASSO INDUSTRY CORP., Taichung (TW)

(72) Inventors: Jian-Rung Wu, Taichung (TW); Rui-Wen Wu, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 0 days.

(21) Appl. No.: 18/092,477

(22) Filed: Jan. 3, 2023

(65) Prior Publication Data

US 2023/0211482 A1 Jul. 6, 2023

(30) Foreign Application Priority Data

Jan. 5, 2022 (TW) ................................. 111200118

(51) Int. Cl.
*B25C 1/00* (2006.01)
*B25C 1/06* (2006.01)

(52) U.S. Cl.
CPC .............. *B25C 1/008* (2013.01); *B25C 1/005* (2013.01); *B25C 1/06* (2013.01)

(58) Field of Classification Search
CPC .......... B25C 1/008; B25C 1/005; B25C 1/04; B25C 1/06; B25C 7/00; B25C 1/18; B25C 1/182; B25C 1/184; B25C 1/186; B25C 1/188; B25C 1/00
See application file for complete search history.

(56) References Cited

U.S. PATENT DOCUMENTS

| | | | | |
|---|---|---|---|---|
| 6,514,131 B1 * | 2/2003 | Reich | ................. | B23Q 11/0046 451/344 |
| 2004/0132354 A1 * | 7/2004 | Nayrac | ..................... | B25C 7/00 439/894 |
| 2012/0073094 A1 * | 3/2012 | Bishop | .................. | F16B 5/0642 24/594.11 |
| 2016/0129573 A1 * | 5/2016 | Anstett | ................... | E04F 21/22 227/148 |

FOREIGN PATENT DOCUMENTS

| | | |
|---|---|---|
| JP | 2009045705 A | 3/2009 |

* cited by examiner

*Primary Examiner* — Veronica Martin
(74) *Attorney, Agent, or Firm* — Burris Law, PLLC

(57) ABSTRACT

A dustproof device for use in an electric nail gun includes a dustproof plate and two fastening members. The electric nail gun includes a muzzle unit used for discharging nails and a machine body unit connected to the muzzle unit and operable to strike the nails. The dustproof plate has a mounting surface facing the machine body unit, an exterior surface that is opposite to the mounting surface and prevents foreign matters from entering the machine body unit, and a through hole that extends through the mounting surface and the exterior surface, that permits the muzzle unit to extend fittingly therethrough, and that is complementary in shape with a contour of a cross section of the muzzle unit. The two fastening members extend from the mounting surface and are detachably connected to the machine body unit to secure the dustproof plate between the machine body unit and the muzzle unit.

9 Claims, 6 Drawing Sheets

DUSTPROOF DEVICE FOR ELECTRIC NAIL GUN

CROSS-REFERENCE TO RELATED APPLICATION

This application claims priority to Taiwanese Utility Model Patent Application No. 111200118, filed on Jan. 5, 2022.

FIELD

The disclosure relates to a dustproof device, and more particularly to a dustproof device for an electric nail gun.

BACKGROUND

Referring to FIG. 1, a conventional nail gun 1 disclosed in Japanese Patent Publication No. 2009045705 generally includes a machine body unit 11 operable to strike nails (not shown), a muzzle unit 12 connected to the machine body unit 11 and used for discharging the nails, a dustproof cover 13 connected to the machine body unit 11, and a plurality of bolts 14 (only one is visible) threadedly connecting the dustproof cover 13 to the machine body unit 11. The dustproof cover 13 serves to prevent foreign matters, such as dust, from entering the machine body unit 11.

However, since the dustproof cover 13 covers a portion of the machine body unit 11 and also retains the portion of the machine body unit 11, the dustproof cover 13 has to be designed to be relative large, and may block the sight of a user during use of the conventional nail gun 1. Further, a hand tool such as a screw driver is required to tighten or loosen the bolts 14 when assembling the dustproof cover 13 to the machine body unit 11 or disassembling the dustproof cover 13 from the machine body unit 11, which is relatively inconvenient.

SUMMARY

Therefore, an object of the disclosure is to provide a dustproof device that can alleviate at least one of the drawbacks of the prior art.

According to the disclosure, a dustproof device adapted for use in an electric nail gun is provided. The electric nail gun includes a magazine unit that is used for accommodating a plurality of nails therein, a muzzle unit that extends in a longitudinal direction, that is connected to the magazine unit, and that is for discharging the nails, and a machine body unit that is connected to the muzzle unit and that is operable to strike the nails. The dustproof device includes a dustproof plate and at least two fastening members. The dustproof plate has a mounting surface that is adapted to face the machine body unit, an exterior surface that is opposite to the mounting surface and that is adapted to prevent foreign matters from entering the machine body unit, and a through hole that extends through the mounting surface and the exterior surface, that is adapted to permit the muzzle unit to extend fittingly therethrough, and that is adapted to be complementary in shape with a contour of a cross section of the muzzle unit. The at least two fastening members extend from the mounting surface of the dustproof plate and are adapted to be detachably connected to the machine body unit to thereby secure the dustproof plate between the machine body unit and the muzzle unit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
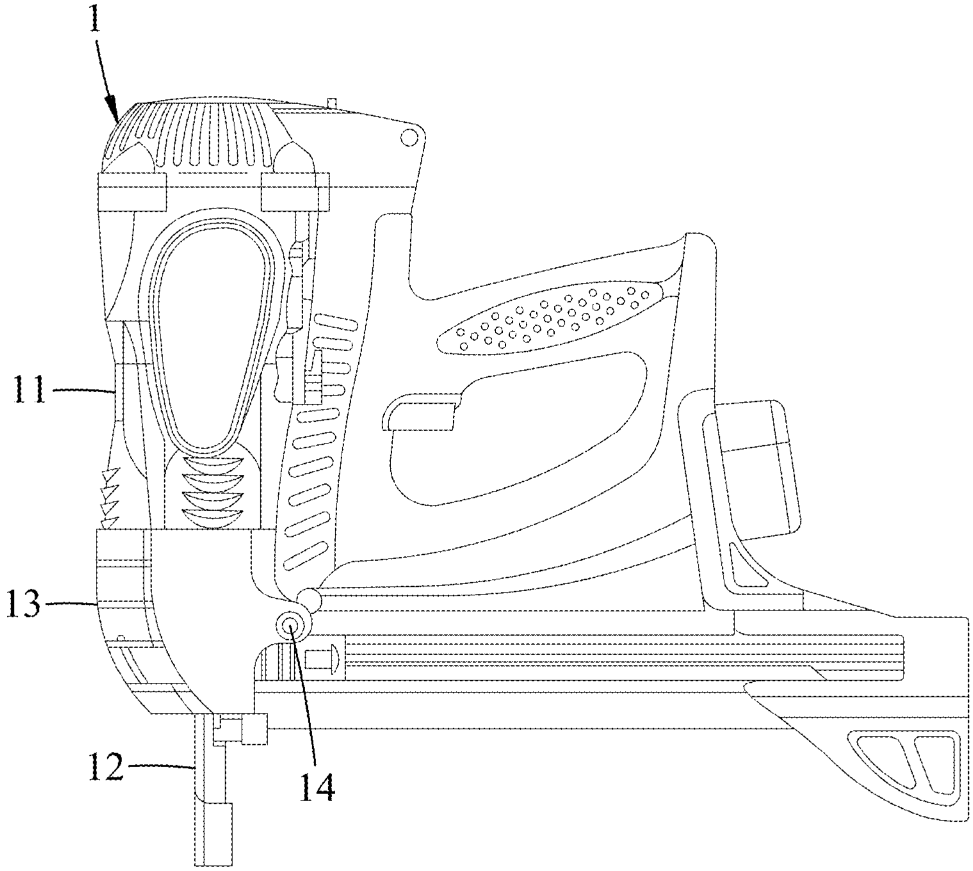
FIG.1 PRIOR ART
FIG. 1 is an elevational view of a conventional nail gun disclosed in Japanese Patent Publication No. 2009045705.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
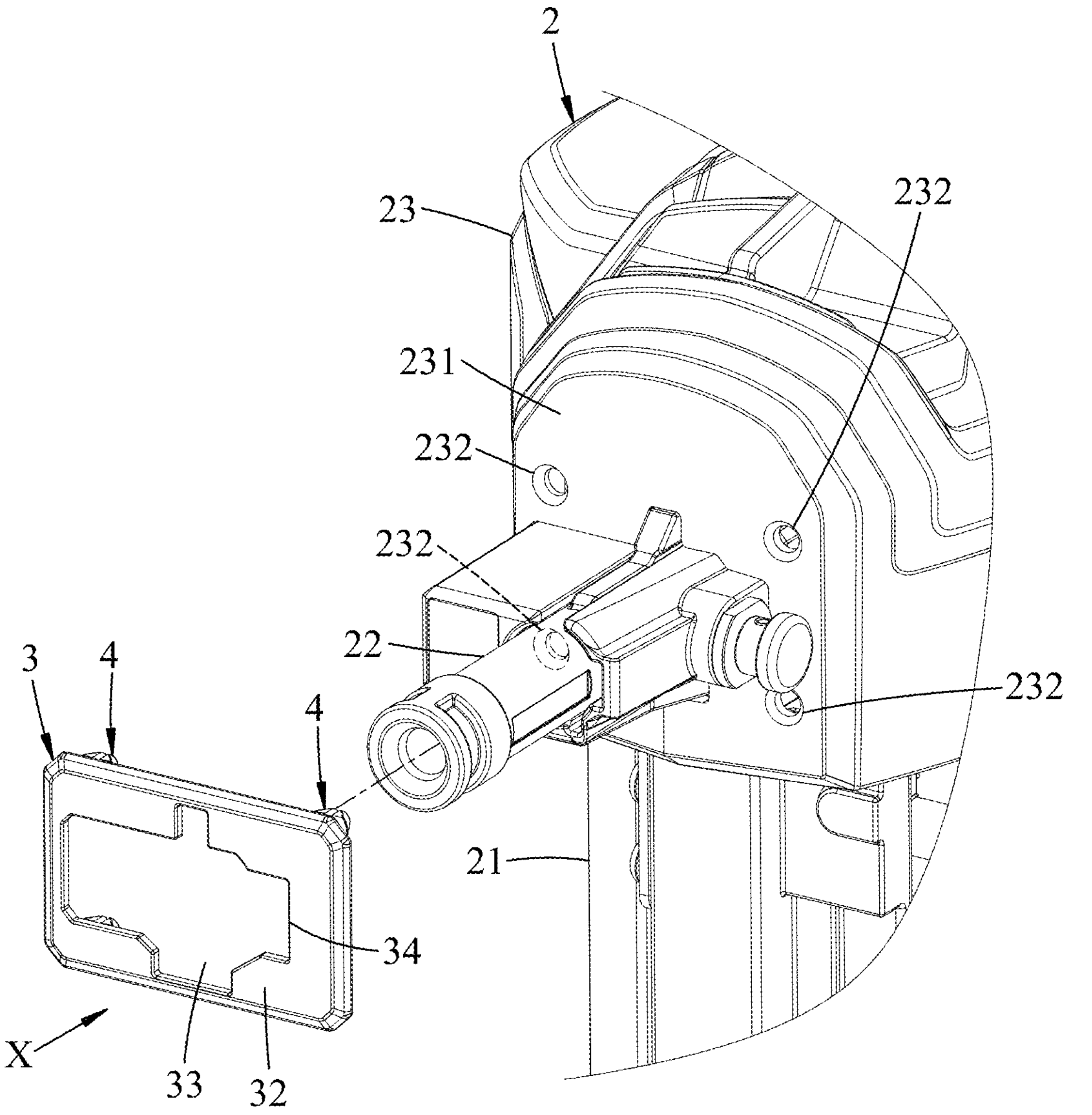
FIG. 2 is a fragmentary exploded perspective view of an electric nail gun including an embodiment of a dustproof device according to the present disclosure.
Figure 3:
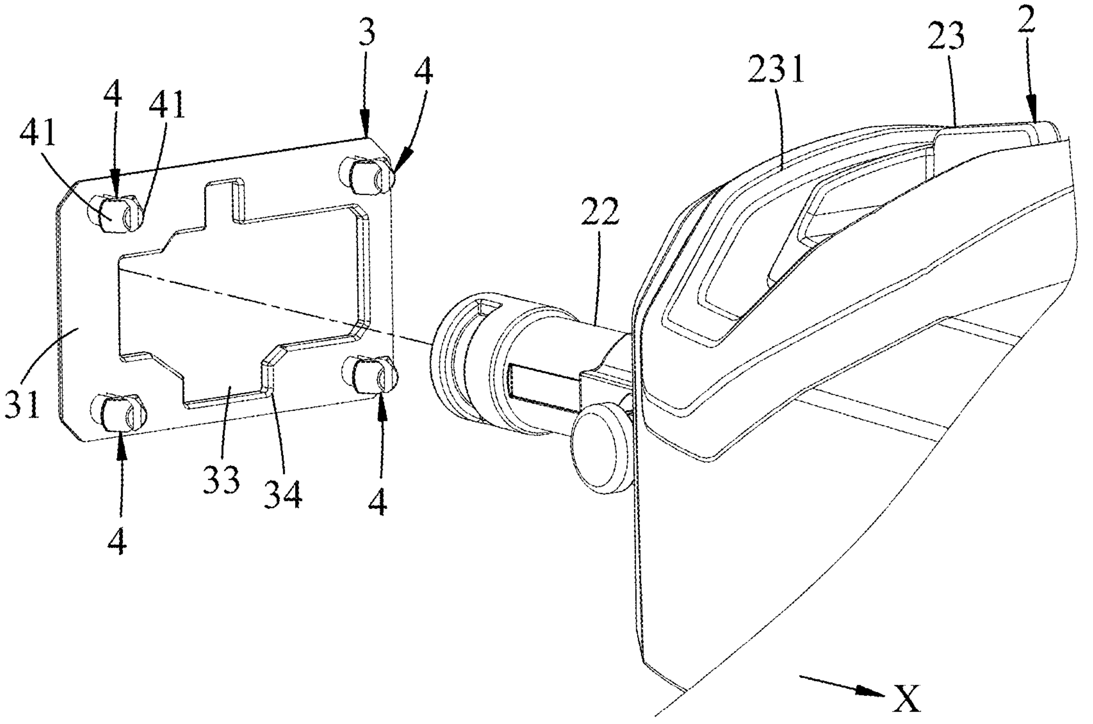
FIG. 3 is a fragmentary exploded perspective view of the electric nail gun including the embodiment from another perspective.
Figure 4:
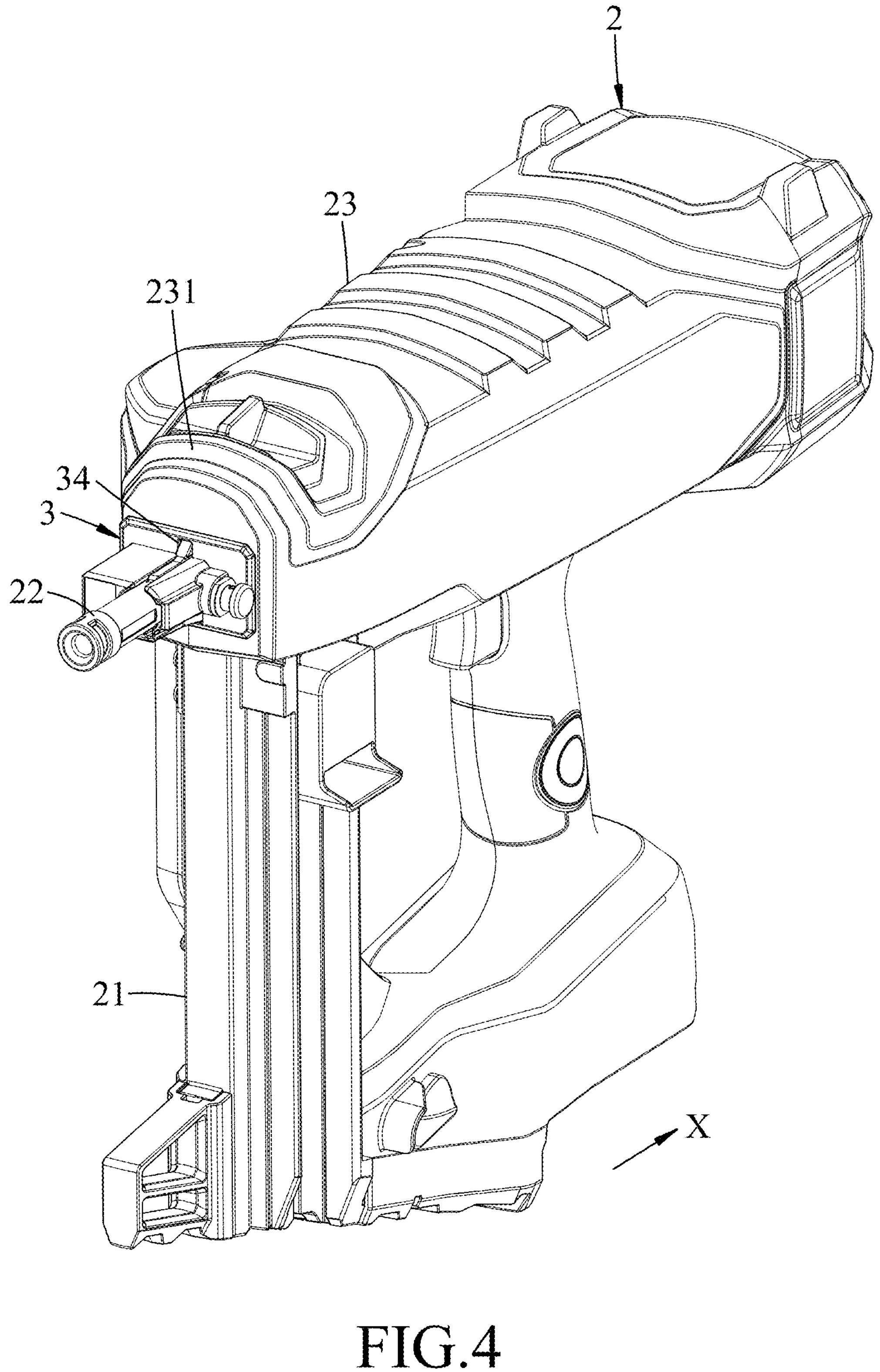
FIG. 4 is an assembled perspective view of the embodiment being mounted to the electric nail gun.

Referring to FIGS. 2 to 4, an embodiment of a dustproof device according to the present disclosure is adapted for use in an electric nail gun 2. The electric nail gun 2 includes a magazine unit 21 that is used for accommodating a plurality of nails (not shown) therein, a muzzle unit 22 that extends in a longitudinal direction (X), that is connected to the magazine unit 21 and that is used for discharging the nails, and a machine body unit 23 that is connected to the muzzle unit 22 and that is operable to strike the nails. The machine body unit 23 includes a housing 231. In this embodiment, the housing 231 is formed with four through openings 232 and includes two halves connected to each other.

The dustproof device includes a dustproof plate 3 and at least two fastening members 4. In this embodiment, the dustproof device includes four fastening members 4 (see FIG. 3).

In this embodiment, the dustproof plate 3 is substantially rectangular, and has a mounting surface 31 that is adapted to face the housing 231 of the machine body unit 23, an exterior surface 32 that is opposite to the mounting surface 31 and that is adapted to prevent foreign matters (e.g., dust) from entering the machine body unit 23, a through hole 33 that extends through the exterior surface 32 and the mounting surface 31 in the longitudinal direction (X), that is adapted to be complementary in shape with a contour of a cross section of the muzzle unit 22, and that is adapted to permit the muzzle unit 22 to extend fittingly therethrough, and a surrounding surface 34 that interconnects the mounting surface 31 and the exterior surface 32, that defines the through hole 33, and that is adapted to be in contact with an outer surface of the muzzle unit 22 in an air tight manner.

In this embodiment, the fastening members 4 extend from the mounting surface 31 of the dustproof plate 3, are disposed respectively adjacent to four corners of the dustproof plate 3, and are adapted to be detachably connected to the machine body unit 23 to thereby secure the dustproof plate 3 between the machine body unit 23 and the muzzle unit 22. Specifically, the fastening members 4 and the dustproof plate 3 are formed integrally, and the fastening members 4 are inseparable from the dustproof plate 3. Each of the fastening members 4 is adapted to protrude from the mounting surface 31 in the longitudinal direction (X) parallel to the muzzle unit 22.

Figure 5:
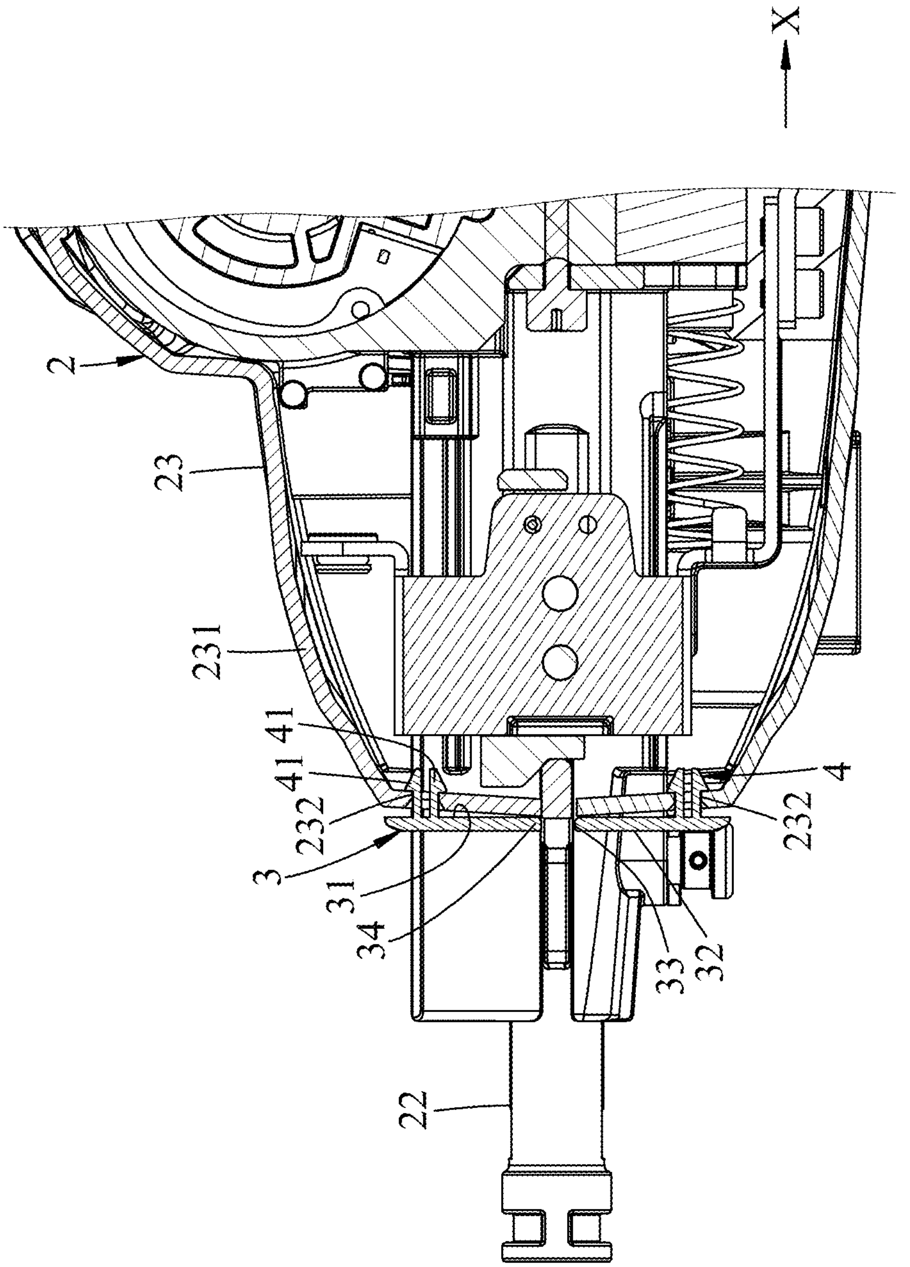
FIG. 5 is a fragmentary sectional view of the embodiment and the electric nail gun.

Further referring to FIG. 5, each of the fastening members 4 has two snap-fit halves 41 that are spaced apart from each other, that are resiliently deformable, and that are adapted to extend through a respective one of the through openings 232 formed in the housing 231 of the machine body unit 23 and to engage an inner surface of the housing 231.

It should be noted that the number of the fastening members 4 is not limited to four, and in other variations of the present embodiment, the number of the fastening members 4 may be two or more than four. In such variations, the number of the through openings 232 of the housing 231 is changed to be the same as the number of the fastening members 4.

To assemble the dustproof device to the electric nail gun 2, the muzzle unit 22 is first brought to extend through the through hole 33 of the dustproof plate 3 and the fastening members 4 are aligned respectively with the through openings 232, then the dustproof plate 3 is pressed toward the housing 231, such that the fastening members 4 respectively extend into the through openings 232 to the extent that the mounting surface 31 is in contact with an outer surface of the housing 231 and the snap-fit halves 41 of each of the fastening members 4 engage the inner surface of the housing 231, so the dustproof plate 3 is secured between the housing 231 and the muzzle unit 22.

In this way, the dustproof plate 3 covers gaps formed between the halves of the housing 231 of the machine body unit 23, and the exterior surface 32 of the dustproof plate 3 prevents foreign matters from entering the machine body unit 23.

To disassemble the dustproof device from the electric nail gun 2, the dustproof plate 3 is simply pulled by a force away from the housing 231, e.g., opposite in the longitudinal direction (X), such that the snap-fit halves 41 of each of the fastening members 4 are forced to deform toward each other to be disengaged from the inner surface of the housing 231, and thus are detached from the respective one of the through openings 232 of the housing 231 during movement of the dustproof plate 3 away from the housing 231.

Figure 6:
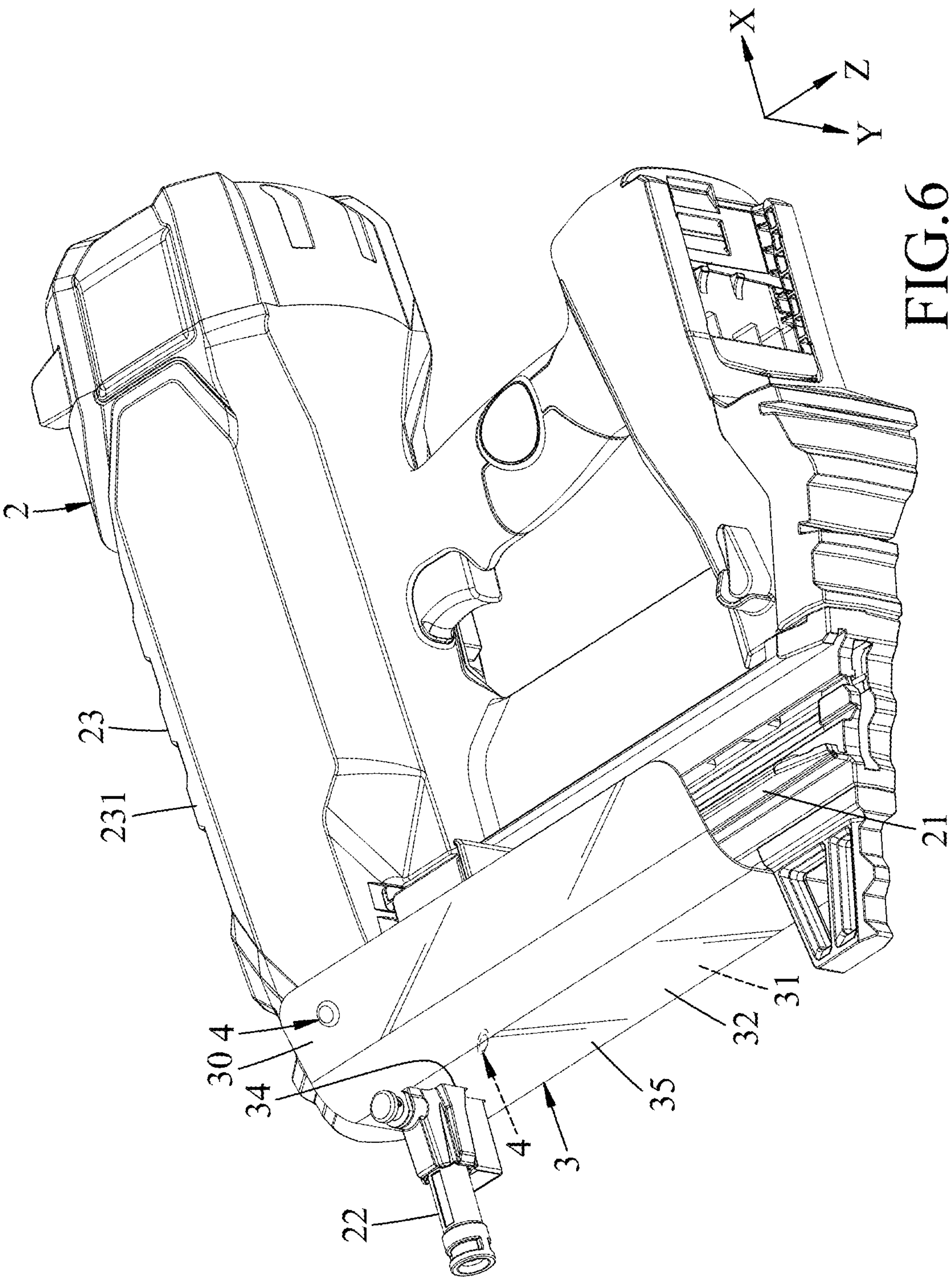
FIG. 6 is a perspective view illustrating the electrical nail gun mounted with a variation of the embodiment.

It should be noted that the dustproof plate 3 is not limited to be used for covering the gaps formed between the halves of the housing 231. In a variation of this embodiment, e.g., as shown in FIG. 6, the dustproof plate 3 has a main portion 30 that is formed with the through hole 33, and an extension portion 35 that extends from the main portion 30 in a height direction (Z) transverse to the longitudinal direction (X). The mounting surface 31 and the exterior surface 32 extend from the main portion 30 to the extension portion 35. The extension portion 35 is adapted to cover at least a portion of the magazine unit 21, is adapted to prevent foreign matters from entering the magazine unit 21, and is made of a light-transmissive material. In this variation, as shown in FIG. 6, the dustproof device includes only two fastening members 4, the housing 231 is formed with two through openings 232, and the extension portion 35 is adapted to cover more than half of the magazine unit 21.

Additionally, in this variation, the fastening members 4 are spaced apart from each other in a width direction (Y) transverse to the longitudinal direction (X) and the height direction (Z), and extend toward each other along an axis that extends in the width direction (Y). Similarly, each of the fastening members 4 is adapted to extend into the respective one of the through openings 232 formed in the housing 231 of the machine body unit 23 and to engage the inner surface of the housing 231.

By virtue of the configuration of the extension portion 35 of the dustproof plate 3, a region of the electric nail gun 2 covered by the dustproof plate 3 is increased as compared to that covered by the embodiment shown in FIGS. 3 to 5, while the sight of the user is not blocked by the dustproof plate 3 during use of the electric nail gun 2 because the extension portion 35 is relatively small, so the dustproof plate 3 of this variation effectively prevents foreign matters from entering the machine body unit 23 and the magazine unit 21.

Through the above description, the advantages of the embodiment of the present disclosure may be summarized in the following.

First, the dustproof plate 3 of the embodiment shown in FIGS. 3 to 5 is in a form of a sheet that covers a portion of the housing 231 adjacent to the muzzle unit 22 so as to prevent foreign matters from entering the housing 231 during use of the electric nail gun 2 while the sight of the user is not blocked by the dustproof plate 3, has a relatively small volume and weight, and a relatively low manufacturing cost.

Second, by virtue of the configuration of the fastening members 4 that are resiliently deformable to engage and disengage the housing 231 of the machine body unit 23, it is convenient to assemble and disassemble the dustproof device of the present disclosure without using a hand tool such as a screw driver.

Third, the extension portion 35 of the dustproof plate 3 shown in FIG. 6 that is light-transmissive increases a dustproof range protected thereby and does not block the sight of the user during use of the electric nail gun 1.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A dustproof device adapted for use in an electric nail gun, the electric nail gun including a magazine unit that is used for accommodating a plurality of nails therein, a muzzle unit that extends in a longitudinal direction, that is connected to the magazine unit, and that is used for discharging the nails, and a machine body unit that is connected to the muzzle unit and that is operable to strike the nails, said dustproof device comprising:

a dustproof plate having a mounting surface that is adapted to face the machine body unit, an exterior surface that is opposite to said mounting surface and that is adapted to prevent foreign matters from entering the machine body unit, and a through hole that extends through said mounting surface and said exterior surface, that is adapted to permit the muzzle unit to extend fittingly therethrough, and that is adapted to be complementary in shape with a contour of a cross section of the muzzle unit; and at least two fastening members extending from said mounting surface of said dustproof plate and adapted to be detachably connected to the machine body unit to thereby secure said dustproof plate between the machine body unit and the muzzle unit.

2. The dustproof device as claimed in claim 1, wherein said dustproof plate includes a surrounding surface that interconnects said mounting surface and said exterior surface, that defines said through hole, and that is adapted to be in contact with an outer surface of the muzzle unit.

3. The dustproof device as claimed in claim 1, wherein said at least two fastening members include four fastening members, said dustproof plate being substantially rectangular, said fastening members being disposed respectively adjacent to four corners of said dustproof plate, each of said fastening members being adapted to protrude from said mounting surface in the longitudinal direction parallel to the muzzle unit.

4. The dustproof device as claimed in claim 3, wherein each of said fastening members has two snap-fit halves that are spaced apart from each other, that are resiliently deformable, and that are adapted to extend through a respective one of through openings formed in a housing of the machine body unit and to engage an inner surface of the housing.

5. The dustproof device as claimed in claim 1, wherein said dustproof plate has a main portion that is formed with said through hole, and an extension portion that extends from said main portion in a height direction transverse to the longitudinal direction, said mounting surface and said exterior surface extending from said main portion to said extension portion.

6. The dustproof device as claimed in claim 5, wherein said extension portion is adapted to cover at least a portion of the magazine unit and to prevent foreign matters from entering the magazine unit.

7. The dustproof device as claimed in claim 5, wherein said extension portion is made of a light-transmissive material.

8. The dustproof device as claimed in claim 5, wherein said at least two fastening members are spaced apart from each other in a width direction transverse to the longitudinal direction and the height direction, and extend toward each other along an axis that extends in the width direction.

9. The dustproof device as claimed in claim 8, wherein each of said fastening members has two snap-fit halves that are spaced apart from each other, that are resiliently deformable, and that are adapted to extend through a respective one of through openings formed in a housing of the machine body unit and to engage an inner surface of the housing.

* * * * *